Sept. 13, 1949.  L. L. LEWIS  2,481,762

HARD RUBBER BALL THREAD GRIPPING LOCK NUT

Filed June 9, 1948

Inventor
LESTER L. LEWIS

Patented Sept. 13, 1949

2,481,762

UNITED STATES PATENT OFFICE 2,481,762

HARD RUBBER BALL THREAD GRIPPING LOCK NUT

Lester L. Lewis, Cabot, Pa.

Application June 9, 1948, Serial No. 31,860

3 Claims. (Cl. 151—7)

This invention relates to lock nuts, and more particularly to a lock nut provided with compressible members adapted to be lockingly engaged with the threads of the bolt or similar member with which the nut is used.

An object of the invention is to provide an improved nut of the type indicated which will be easily applied, and which will effectively secure the nut in adjusted position.

A further object of the invention is to provide a device of the character indicated capable of being removed and re-applied, as desired.

The invention consists in the novel construction, arrangement and combinations of parts hereinafter more particularly described and claimed.

One sheet of drawings accompanies this specification, as part thereof, in which like reference characters indicate like parts throughout.

Figure 1:
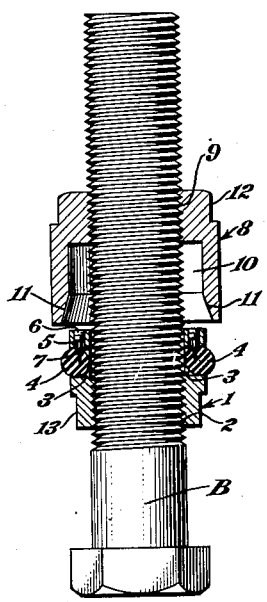
Figure 1 is a longitudinal cross section through the improved nut, showing the mode of application to a bolt.

In the embodiment of the invention illustrated in the drawing, my improved nut comprises two parts, 1 and 8, adapted to coact to compress rubber or composition balls 4 into locking engagement with the threads of a bolt B.

As illustrated, the member 1 is formed with an interiorly threaded bore 2 and with a plurality of radial bores 3 spaced inwardly from one end of the member, in which end a plurality of threaded bores 5 extending parallel with the axis of the threaded bore 2, are formed, communicating between the marginal end portion of the member and the radial bores 3. Threaded prong-carrying screws 6 are adapted to seat in the threaded bores 5 with their prongs 7 engaging and holding in proper position the rubber balls 4 which are seated in the radial passages 3 so that these balls are preliminarily held in proper association with the member 1 at all times. The other end of the member 1 is exteriorly formed of an irregular or polygonal shape, as at 13, to accommodate a wrench by means of which the member 1 can be screwed to its proper position on the bolt B.

The complementary member 8 is formed with an axial internally threaded bore 9 adapted to co-mate with the bolt B and with an enlarged axial cavity 10, the marginal edge of which enlarged cavity 10 is internally beveled as at 11, to form an annular cam surface. The enlarged cavity 10 in the member 8 is formed of a diameter to provide a sliding fit with the exterior of the body of member 1, so that when member 8 is threaded down on the bolt B the main portion of the member 1 is embraced in the cavity 10, while the annular cam surface 11 depresses the rubber balls 4 into locking engagement with the threads on the bolt B. The end of member 8 opposite the axial cavity 10 is exteriorly formed of an irregular or polygonal shape, as at 12, to accommodate a wrench by means of which member 8 can be screwed to its proper position on the bolt B.

Figure 2:
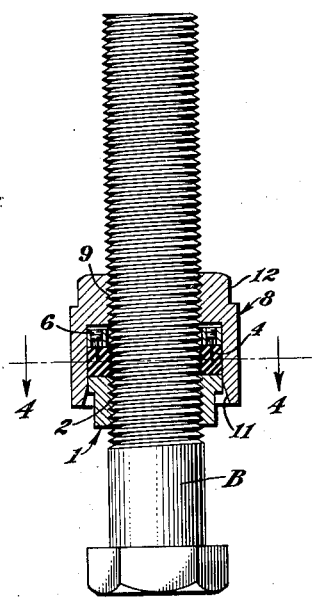
Figure 2 is a similar view showing the nut in its locked position on a bolt.
Figure 3:
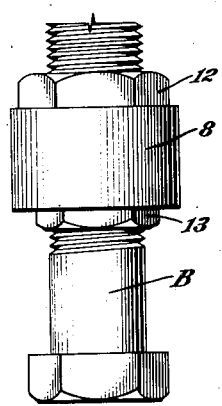
Figure 3 is a side elevation of an improved nut locked upon a bolt.
Figure 4:
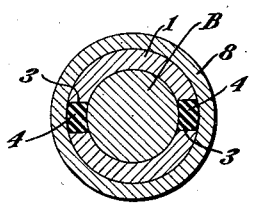
Figure 4 is a transverse cross section taken on line 4—4 of Figure 2.

In Figure 1 of the drawing the parts of the lock nut are shown separated preliminary to locking the same upon the bolt, while in Figure 2 the part 8 is shown threaded down over the part 1 with the rubber balls 4 firmly compressed into locking engagement with the threads of the bolt.

The radial ports 3 and balls 4 are so proportioned in size that the balls will, prior to locking the two parts of the nut together, project substantially beyond the outer mouths of the ports 3, as is well illustrated in Figure 1.

The balls 4 can be made of rubber of varying degrees of hardness, depending upon the nature of the particular work intended to be performed, or can be made of plastics or ductile metals, as may be desired.

Having thus described my invention, I claim:

1. Lock nut comprising complementary nut members, each having axially disposed threaded bores adapted to co-mate with a common bolt, and polygonal end portions adapted to accommodate a wrench, one of said members formed with an axially disposed open ended chamber proportioned to seat closely over a portion of the other, the wall of said chamber adjacent said open end beveled to constitute an inwardly facing annular cam surface, the other member having a port proportioned to seat in said chamber and formed with radially disposed passages, hard rubber balls seated one in each radial passage and proportioned to project beyond the outer end of said passage when their inner surfaces are in alignment with the threaded bore.

2. Device of claim 1 with means for retaining the hard rubber balls in position in said radial passages.

3. Device of claim 1 with an axially disposed threaded bore associated with and communicating each of said radial bores with an end face of that member with pronged screws adapted to seat in said threaded bores to engage and position the balls with respect to the nut member.

LESTER L. LEWIS.

No references cited.